United States Patent
Hermanson et al.

(10) Patent No.: US 6,983,340 B1
(45) Date of Patent: Jan. 3, 2006

(54) METHOD AND SYSTEM FOR EXTENDING A DISTANCE BETWEEN A PERSONAL COMPUTER AND A KEYBOARD, VIDEO DISPLAY, A MOUSE, AND SERIAL PORT

(75) Inventors: Todd A. Hermanson, Cedar Rapids, IA (US); John R. Bodensteiner, Cedar Rapids, IA (US); David T. Medin, Marion, IA (US); Steven R. Waller, Hiawatha, IA (US)

(73) Assignee: Crystal Group Inc., Hiawatha, IA (US)

( * ) Notice: Subject to any disclaimer, the term of this patent is extended or adjusted under 35 U.S.C. 154(b) by 711 days.

(21) Appl. No.: 09/681,175

(22) Filed: Feb. 9, 2001

(51) Int. Cl.
*G06F 13/00* (2006.01)

(52) U.S. Cl. ............. 710/301; 710/300; 710/100
(58) Field of Classification Search ......... 710/100, 710/301, 300; 345/163, 168; 709/204, 246
See application file for complete search history.

(56) References Cited

U.S. PATENT DOCUMENTS

| | | | | |
|---|---|---|---|---|
| 5,193,200 A | * | 3/1993 | Asprey et al. ............. 345/168 |
| 5,375,068 A | * | 12/1994 | Palmer et al. ............. 709/204 |
| 6,038,616 A | * | 3/2000 | Thornton et al. ............. 710/2 |
| 6,078,974 A | * | 6/2000 | Kirshtein ................. 710/305 |
| 6,081,856 A | * | 6/2000 | Comer ..................... 710/67 |
| 6,112,264 A | * | 8/2000 | Beasley et al. ............ 710/38 |
| 6,119,146 A | * | 9/2000 | Heller et al. ............. 709/203 |
| 6,146,150 A | * | 11/2000 | Roberts ................... 439/55 |
| 6,219,730 B1 | * | 4/2001 | Nguyen ................... 710/62 |
| 6,345,323 B1 | * | 2/2002 | Beasley et al. ............ 710/38 |
| 6,385,666 B1 | * | 5/2002 | Thornton et al. ........... 710/2 |
| 6,609,034 B1 | * | 8/2003 | Behrens et al. ........... 700/19 |
| 6,633,934 B1 | * | 10/2003 | Thornton ................ 710/100 |

OTHER PUBLICATIONS

ATI-TV Wonder User's Guide, 1999, p. 9.*
Printed seven pages of a website on Jul. 31, 2001 and Aug. 1, 2001. The web address was http://www.minicom.com.

* cited by examiner

*Primary Examiner*—Glenn A. Auve
*Assistant Examiner*—Nimesh Patel
(74) *Attorney, Agent, or Firm*—Simmons, Perrine, Albright & Ellwood, PLC

(57) ABSTRACT

A system and method for extending a separation distance between a PC and its accompanying keyboard, video display, mouse and serial port, which includes an internal expansion card disposed in a PC where the expansion card combines/multiplexes conventional keyboard, video display, mouse and serial signals, to/from a combined signal on a single elongated link cable extending to a remote module disposed near the remote keyboard, video display, mouse and ports.

20 Claims, 3 Drawing Sheets

METHOD AND SYSTEM FOR EXTENDING A DISTANCE BETWEEN A PERSONAL COMPUTER AND A KEYBOARD, VIDEO DISPLAY, A MOUSE, AND SERIAL PORT

BACKGROUND OF INVENTION

In recent years, personal computers have become increasingly prevalent in industries. It is not uncommon today for a company to have scores, if not of PCs in one room with a similar number of stations from which to access these PCs. Often, it is desirable to have the video display, keyboard, and mouse from the location of the PC. Various prior art keyboard, video display, mouse and serial port extenders have been used in the past. One example of a prior art extender system is shown in FIG. 1. This system includes a local module which is adjacent to and external to the PC.

While these extender systems have been used extensively in the past, they do have some drawbacks. First of all, with the local module exterior to the PC, it is necessary to have an additional power supply for the local module. Secondly, there must be a location for this local module; this can be especially troubling when the is an industrial PC disposed in a rack having little additional space for additional modules. Thirdly, the cabling between the local module and the PC often interferes with other cabling.

Consequently, there exists a need for improved methods and systems for extending the separation distance of peripherals and a PC in an efficient manner.

SUMMARY OF INVENTION

It is an object of the present invention to provide a system and method for extending the separation distance of peripherals and a PC in an efficient manner.

It is a feature of the present invention to utilize a single half-size expansion extender card having both ISA and PCI bus connections thereon to perform as a local module.

It is another feature of the present invention to include loop wires to connect normal PC video, mouse, keyboard and serial connections to the video, mouse, keyboard and serial connections of the extender card.

It is an advantage of the present invention to achieve improved efficiency in installation, manufacture and maintenance of equipment for extending the separation of video, mouse, keyboard and serial port from personal computers.

The present invention is an apparatus and method for extending the separation distance of peripherals and personal computers, designed to satisfy the aforementioned needs, provide the previously stated objects, include the above-listed features, and achieve the already articulated advantages. The present invention is carried out in a "wasted installation time-less" manner in a sense that the time consumed with installing an extender system for a PC, especially a PC in a rack of PCs, has been greatly reduced.

Accordingly, the present invention is a system and method including a single extender card having both ISA and PCI bus connections and loop wires to externally couple the video, mouse, keyboard and serial signals.

BRIEF DESCRIPTION OF DRAWINGS

The invention may be more fully understood by reading the following of the preferred embodiments of the invention, in conjunction with the appended drawings wherein.

DETAILED DESCRIPTION

Figure 1:
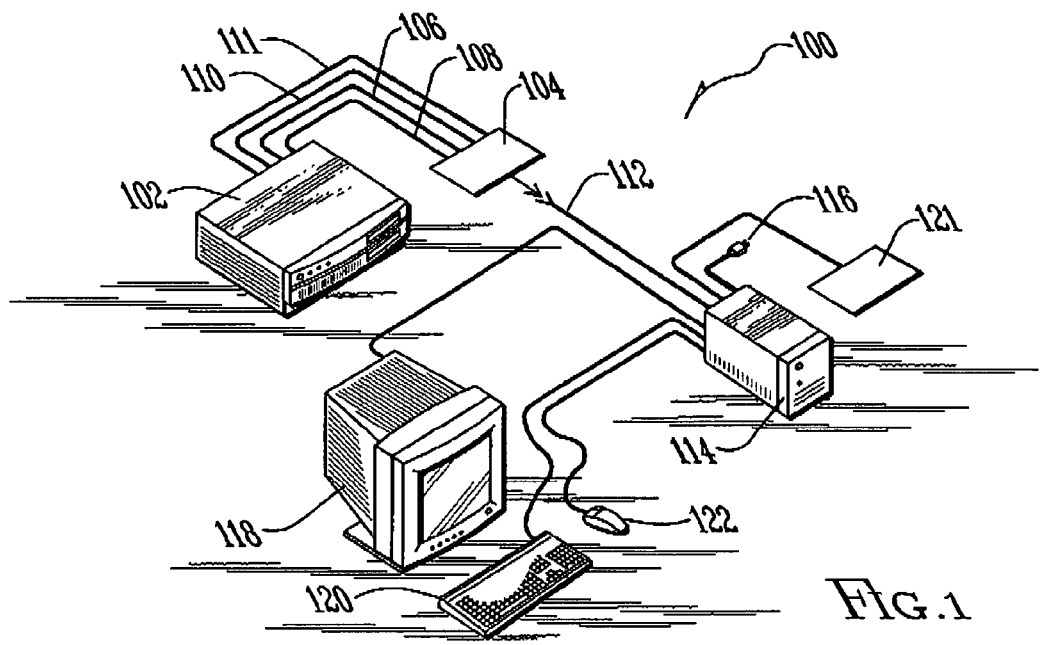
FIG. 1 is a simplified block diagram view of a system of the prior art.

Now referring to the drawings wherein like numerals refer to like matter throughout, and more specifically referring to FIG. 1, there is shown a system of the prior art, generally designated 100, including a prior art PC 102 which is to a local module 104 via independent cables, such as mouse extension cable 106, keyboard extension cable 108, video extension cable 110 and serial extension 111. Local module 104 is well known in the art and is known to be used to separate keyboard, mouse, video and serial signals onto a single cable, such as cable 112, which is often a category 5 unshielded twisted pair cable having male 45 connectors on either end. Link cable 112 provides the communication path between local module 104 and remote module/receiver/transmitter 114. Remote module/receiver/transmitter 114 is also well known in the art and is known to separate signals on link cable 112 into distinct cables for communication with remote video display 118, remote keyboard 120, remote mouse 122, and remote serial port or I/O device 121.

Figure 2:
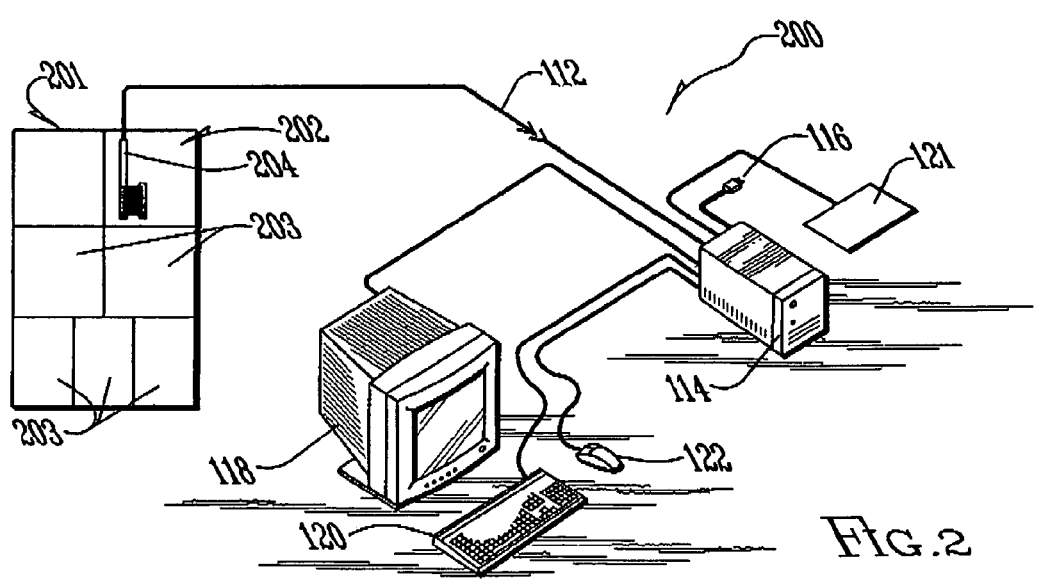
FIG. 2 is a simplified block diagram view of a system of the present

Now referring to FIG. 2, there is shown a system of the present invention, generally designated 200, including a rack 201 including a plurality of industrial PCs 203 and an expansion slot equipped PC 202 having a PCI/ISA keyboard, video, mouse extender expansion card 204 therein. The term "industrial PC" is used to refer to any type of PC which is configured and adapted to be housed in a rack which would contain multiple similar PCs. Expansion slot equipped PC 202 can be any type of PC which is capable of receiving therein an expansion card or other device coupled to an internal expansion bus. PCI/ISA keyboard, video, mouse and serial extender expansion card 204 is preferably a single card having both ISA and PCI mating regions thereon. Expansion slot equipped PC 202 is coupled to remote module/receiver/transmitter 114 by link cable 112. Remote module/receiver/transmitter 114 is coupled to power source 116, remote video display 118, remote keyboard 120, remote serial I/O device 121 and remote mouse 122 in a well-known manner.

Figure 3:
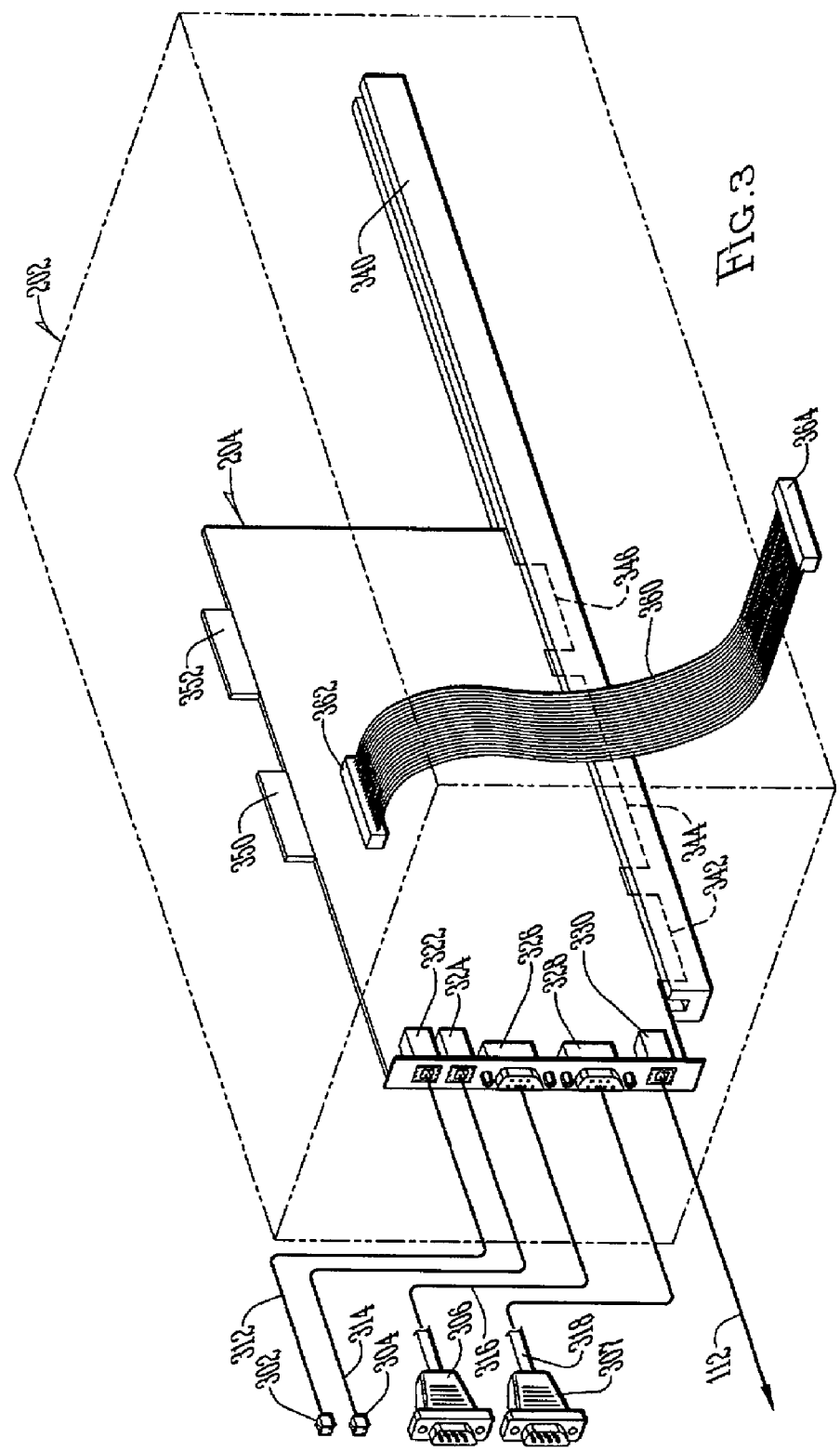
FIG. 3 is a partial cut-away view of a portion of the system of FIG. 2.

A more detailed understanding of the present invention can be achieved by referring to FIG. 3, which shows an enlarged cut-away view of expansion slot equipped PC 202 of FIG. 2. In a preferred embodiment of the present invention, expansion slot equipped PC 202 is an industrial PC which has sensors therein monitor fan speeds and a temperature of a microprocessor therein and further generates an alert when said fan speeds and said temperature exceed predetermined limits. The sensors are not shown, but are well known in the art. It can be seen that expansion slot equipped PC 202 includes therein a PCI/ISA keyboard, video, mouse and serial extender expansion card 204, of the present invention. PCI/ISA keyboard, video, mouse, and serial extender expansion card 204 is preferably a half-length planar expansion card. PCI/ISA keyboard, video, mouse, and serial extender expansion card 204 communicates with expansion slot PC 202 via cables 312, 314, and 316. Expansion slot equipped PC 202 has thereon PC to keyboard connector 302, which is well known in the art for making such connections. Expansion slot equipped PC 202 further includes PC to mouse connector 304, PC to video connector 306, and PC to serial connector 307, which also well known in the art for making such connections. Cables 312, 314, 316 and 318 are preferably well-known keyboard, mouse, video and serial cables respectively. Cables 312, 314, 316 and 318 are coupled to keyboard PC to expansion card connector 322, mouse PC to expansion card connector 324, video PC to expansion card connector 326, and serial PC to expansion card connector respectively.

PCI/ISA keyboard, video, mouse and serial extender expansion card 204 also includes an expansion card to remote module cable link connector 330 which is used to couple to link cable 112.

In a preferred embodiment, PCI/ISA keyboard, video, mouse and serial extender expansion card 204 is powered by connections provided through PCI mating regions 342, 344, and 346. PCI/ISA keyboard, video, mouse and serial extender expansion card 204 also includes thereon a first ISA mating region 350 and a second ISA mating region 352, which could be used for coupling with an ISA bus connector in expansion slot equipped PC 202 or another PC having an ISA bus. ISA mating regions 350 and 352 can be used to power the preferred embodiment in lieu of PCI regions 342, 344, and 346 when placed in a PC ISA slot. First PCI mating region 342, second PCI mating region 344, and third PCI mating region 346 are shown disposed in PCI expansion slot 340. Typically, PCI expansion slot 340 might be used to couple any type of PCI expansion card with the main processor of the expansion slot equipped PC 202; however, in this preferred embodiment of the present invention, the connection between PCI expansion slot 340 and first PCI mating region 342, second PCI mating region 344, or third PCI mating region 346 would provide only power to the PCI/ISA keyboard, video, mouse and serial extender expansion card 204. All of the keyboard, mouse, video and serial signals to be communicated between the PCI/ISA keyboard, video, mouse and serial extender expansion card 204 and the main processor of expansion slot equipped PC 202, is done through the cables 312, 314, 316 and 318.

Also shown is a serial internal ribbon cable 360, which couples to an internal connector 362 and a second serial ribbon cable connector 364, which could be either internal or external.

In operation, the apparatus and method of the present invention as described FIGS. 2–3, could function as follows:
 a PC with either a PCI or ISA expansion bus is provided;
 a PCI/ISA keyboard, video, mouse and serial extender expansion card 204 is inserted into the expansion bus and receives power therefrom;
 keyboard, mouse, serial and video signals are communicated between the PC and the PCI/ISA keyboard, video, mouse and serial extender expansion card 204 jumpers or cables 312, 314, 316 and 318 which connect to the standard keyboard, mouse and video connectors found on the back of the PC, and the serial header typically found internal or external to a PC;
 keyboard, mouse, serial and video signals are combined into a single port;
 a link cable 112 is coupled to remote module/receiver/transmitter 114;
 the combined signals are transmitted over Category 5 UTP link cable 112 to remote module/receiver/transmitter 114 where the combined signals are and,
 the then separated signals are delivered to keyboard, mouse, serial and video devices.

Figure 4:
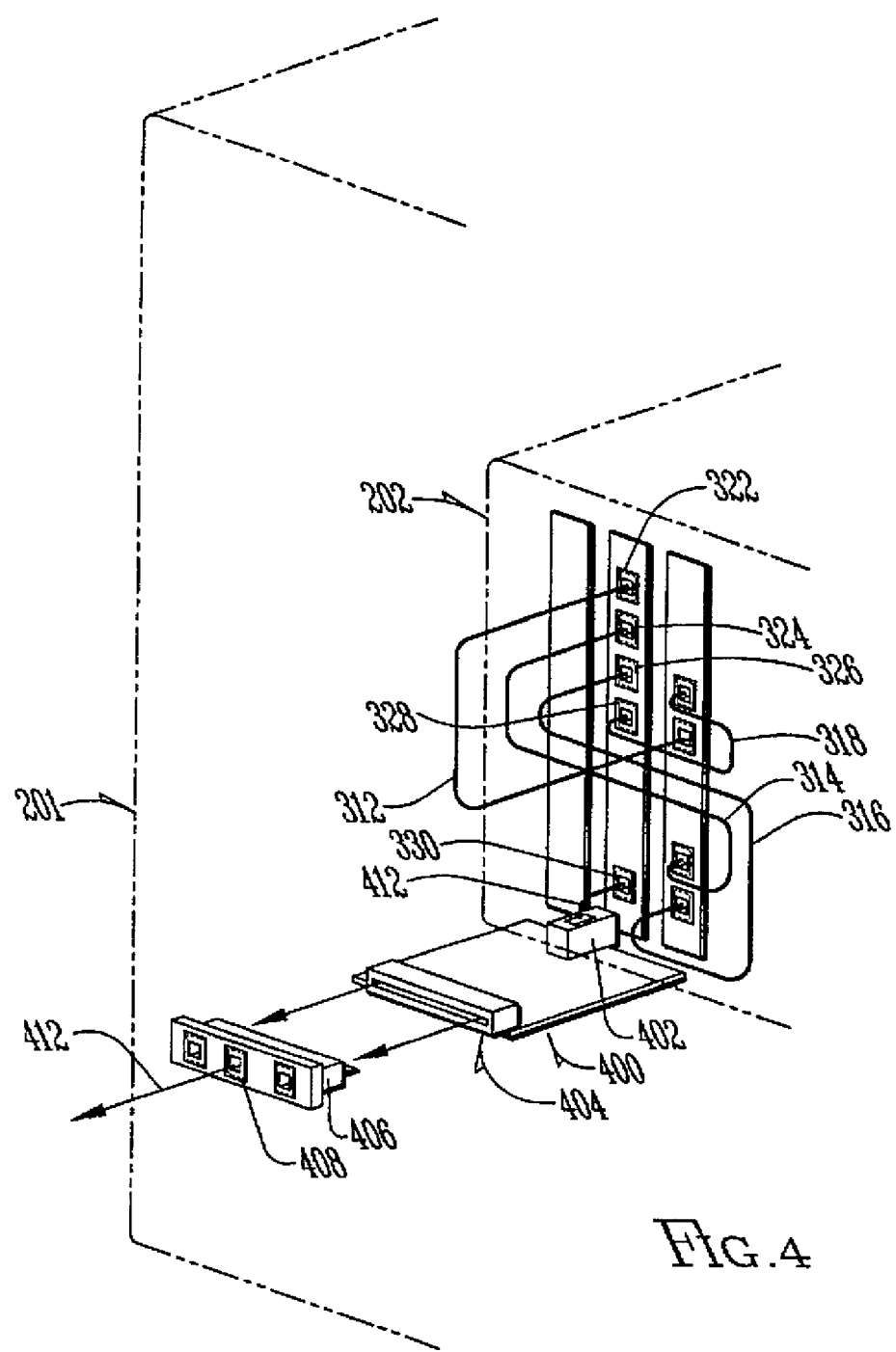
FIG. 4 is a schematic representation of a rear portion of a PC of the present invention having a blind-mateable connector thereon.

Now referring to FIG. 4, there is shown a rear portion of a PC 202 of the present invention which includes connector cables 312, 314, 316 and 318 of 3. This FIG. 4 includes a blind-mateable male connector, generally designated 400, having a female RJ-45 jack thereon for receiving jumper Category 5 UTP cable 412, which is similar to elongated cable 112, except for length. Connector 400 includes a male blind-mating connector 404. Also shown is an associated blind-mating female connector 406, which is part of the rack 201. The elongated cable 112 is shown coupled to a female RJ-45 connector 408. It should be understood this is merely a preferred embodiment, and variations of the present invention, including, but not limited to, switching male and female connectors, etc., are contemplated and intended to be included herein.

Throughout this description, reference is made to an industrial PC because it is believed that the beneficial aspects of the present invention would be most readily apparent when used in connection with industrial PCs; however, it should be understood that the present invention is not intended to be limited to industrial and should be hereby construed to include other non-industrial PCs as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:
1. A system for extending a separation range of a keyboard, a video display and a mouse from a PC, the system comprising:
 a PC having an expansion slot therein;
 said PC having PC-mounted conventional keyboard, video display and mouse connectors thereon configured for coupling with conventional keyboard, video display and mouse connection cables;
 said expansion slot being configured for provision of power and digital information when said expansion slot is occupied;
 a keyboard, video display and mouse extender expansion card which is configured for combining and separating keyboard, video display and mouse signals; said keyboard, video display and mouse extender expansion card disposed in said expansion slot, and receiving power therefrom, but not communicating said keyboard, video display and mouse signals through said expansion slot;
 said keyboard, video display and mouse extender expansion card having extender card mounted conventional keyboard, video display and mouse connectors thereon which are coupled to said PC-mounted conventional keyboard, video display and mouse connectors via connecting cables having conventional keyboard, video display and mouse connectors thereon, so that signals output from said PC are looped back and become inputs to said keyboard, video display and mouse extender expansion card;
 said keyboard, video display and mouse extender expansion card further having an extender card mounted elongated cable jack for receiving an elongated cable therein which carries previously independent keyboard, video display and mouse signals which have been combined; said elongated cable having a first end and a second end; and, a remote module/receiver/transmitter coupled to said second end of said elongated cable, said remote module/receiver/transmitter adapted and configured to combine previously independent signals into a combined signal and to separate earlier combined signals for distribution to keyboard, video display and mouse devices.

2. A system of claim 1 wherein said keyboard, video display and mouse extender expansion card has disposed on opposing sides thereof, a PCI bus mating region and an ISA bus mating region.

3. A system of claim 2 wherein said elongated cable is a UTP cable.

4. A system of claim 3 wherein said UTP cable is a category 5 UTP cable.

5. A system of claim 4 wherein said UTP cable has a first end with a first male connector and a second end with a second male connector thereon.

6. A system of claim 5 wherein said first male connector and said second male connector are identical.

7. A system of claim 6 wherein said first male connector and said second male connector are RJ-45 connectors.

8. A system of claim 7 wherein each of said connecting cables has identical connectors on each end thereof.

9. A system of claim 8 wherein nothing other than power is provided through said expansion slot.

10. A system of claim 1 wherein:
said keyboard, video display and mouse extension card is further adapted and configured for combining and separating serial signals; and
said extender card mounted elongated cable jack is further adapted and configured for receiving an elongated cable therein which carries previously independent keyboard, video display, mouse and serial signals which have been combined.

11. A computer system comprising:
a PC having exterior means for connecting video signals to a video display, exterior means for connecting mouse signals from a mouse, and exterior means for connecting keyboard signals from a keyboard;
means, internal to said PC, for interfacing said video signals, said mouse signals from a mouse, and said keyboard signals, with a composite signal;
means, internal to said PC, for providing power to said means for interfacing, without communicating said keyboard signals, said mouse signals and said video display signals across an expansion card slot disposed within said PC;
exterior cabling means for coupling said exterior means for connecting video signals with an exterior connector portion of said means, internal to said PC, for interfacing, so that each of said video signals, said mouse signals and said keyboard signals are looped back from being an output of said PC to being input signals to said means, internal to said PC for interfacing;
a remote means, external to said PC, for separating video signals from a said composite signal, combining said signals from a mouse and said keyboard signals into said composite signal; and,
means for transmitting said composite signal to said remote means.

12. A system of claim 11:
wherein said exterior means for connecting video signals is a conventional VGA output connector;
said PC further having internal provisions for connecting an RS-232 serial port;
said means, internal to said PC, for interfacing further adapted and configured for interfacing signals from a serial port with said composite signal.

13. A system of claim 12 wherein said means, internal to said PC, for interfacing is an expansion card in an expansion slot.

14. A system of claim 13 wherein said expansion card includes means for alternatively coupling with an ISA and a PCI expansion slot.

15. A system of claim 14 wherein said means, internal to said PC, for providing power is a power connection in an expansion bus slot in said PC.

16. A system of claim 15 wherein said exterior cabling means are a plurality of conventional cables forming loop wires.

17. A system of claim 16 wherein said means for transmitting is a single category 5 UTP cable.

18. A system of claim 17 further including on said expansion card means for coupling to a serial port.

19. A system of claim 18 wherein said means for coupling to a serial port is internal to said PC.

20. A system for extending a separation range of a keyboard, a video display and a mouse from a PC, the system comprising:
a rack for receiving therein industrial PCs;
a PC, disposed in said rack, said PC having an expansion slot therein;
said PC being an industrial PC having sensors therein which monitor fan speeds and a temperature about a microprocessor in said PC;
said PC having PC-mounted conventional keyboard, video display, mouse and serial connectors thereon configured for coupling with conventional keyboard, video display, mouse and serial connection cables;
said expansion slot being configured for provision of power and digital information when said expansion slot is occupied;
a half-length planar keyboard, video display, mouse and serial extender expansion card which is configured for combining and separating keyboard, video display, serial and mouse signals; said keyboard, video display, mouse and serial extender expansion card disposed in said expansion slot, and receiving power therefrom, but not communicating keyboard, video display, serial and mouse signals across said expansion slot;
said keyboard, video display, mouse and serial extender expansion card having extender card mounted conventional keyboard, video display, mouse and serial connectors thereon which are coupled to and looped back from said PC-mounted conventional keyboard, video display, mouse and serial connectors via connecting cables having conventional keyboard, video display, mouse and serial connectors thereon;
said keyboard, video display, mouse and serial extender expansion card further having an extender card mounted elongated cable jack for receiving an elongated cable therein which carries previously independent keyboard, video display, mouse and serial signals which have been combined; said elongated cable having a first end and a second end;
a remote module/receiver/transmitter coupled to said second end of said elongated cable, said remote module/receiver/transmitter adapted and configured to combine previously independent signals into a combined signal and to separate earlier combined signals for distribution to keyboard, video display, mouse and serial devices;

wherein said keyboard, video display, mouse and serial extender expansion card has disposed on opposing sides thereof, a PCI bus mating region and an ISA bus mating region;

wherein said elongated cable is a UTP cable;

wherein said UTP cable is a Category 5 UTP cable;

wherein said UTP cable has a first end with a first male connector and a second end with a second male connector thereon;

wherein said first male connector and said second male connector are identical;

wherein said first male connector and said second male connector are RJ-45 connectors;

wherein each of said connecting cables has identical connectors on each end thereof; and, wherein said keyboard, video display, mouse and serial extender expansion card is provided only power through said expansion slot.

* * * * *

UNITED STATES PATENT AND TRADEMARK OFFICE
CERTIFICATE OF CORRECTION

PATENT NO. : 6,983,340 B1
DATED : January 3, 2006
INVENTOR(S) : Todd A. Hermanson et al.

It is certified that error appears in the above-identified patent and that said Letters Patent is hereby corrected as shown below:

Title page, Item [54] and Column 1, line 3,
Title, after "KEYBOARD", insert -- A --.

Title page,
Item [57], ABSTRACT,
Line 9, after "and", insert -- serial --.

Column 1,
Line 10, after "not", insert -- hundreds --.
Line 13, after "mouse", insert -- separated --.
Line 20, after "is", insert -- often --.
Line 23, after "the", insert -- PC --.
Line 40, after "connect", insert -- the --.
Line 65, after "following", insert -- description --.

Column 2,
Line 2, after "present", insert -- invention --.
Line 14, after "is", insert -- coupled --.
Line 17, after "extension" (second occurrence), insert -- cable --.
Line 18, after "to", insert -- combine --.
Line 20, after "as", insert -- link --.
Line 21, after "male", insert -- RJ- --.
Line 49, after "by", insert -- now --.
Line 53, after "therein", insert -- which --.
Line 54, after "further", insert -- which --.
Line 64, after "slot", insert -- equipped --.
Line 65, after "thereon", insert -- a --.

Column 3,
Line 2, after "which", insert -- are --.
Line 9, after "connector", insert -- 328 --.
Line 52, after "204", insert -- via --.
Line 55, after "header", insert -- port --.
Line 63, after "are", insert -- separated --.

UNITED STATES PATENT AND TRADEMARK OFFICE
CERTIFICATE OF CORRECTION

PATENT NO. : 6,983,340 B1
DATED : January 3, 2006
INVENTOR(S) : Todd A. Hermanson et al.

It is certified that error appears in the above-identified patent and that said Letters Patent is hereby corrected as shown below:

<u>Column 4,</u>
Line 1, after "of", insert -- Fig. --.
Line 9, after "understood", insert -- that --.

Signed and Sealed this

Twenty-eighth Day of March, 2006

JON W. DUDAS
*Director of the United States Patent and Trademark Office*